UNITED STATES PATENT OFFICE.

ROBERT E. WILSON, OF THE UNITED STATES ARMY.

ABSORBENT.

1,333,524.  Specification of Letters Patent.  Patented Mar. 9, 1920.

No Drawing.  Application filed November 15, 1918. Serial No. 262,707.

*To all whom it may concern:*

Be it known that I, ROBERT E. WILSON, Chemical Warfare Service, United States Army, a citizen of the United States, and residing at Washington, District of Columbia, have invented new and useful Improvements in Absorbents, of which the following is a specification.

This invention relates to absorbents for gases, more especially deleterious gases mixed with air, and has for its object the provision of a new and improved absorbent which shall be very active, hard, uniform, granular, have a high absorption efficiency, offer a low resistance to the passage of gases and have a long life.

In carrying my invention into effect, I provide a new and improved method of preparation of this absorbent, which is of the soda lime type, used for the absorption of carbon dioxid from exhaled air. Such compositions are capable of use where purification of a gas is desired as in the canisters of gas masks, and are especially adapted for use on submarines for the purification of the air during the period of submergence or in similar situations. The air is then being continually rebreathed and soon becomes so laden with exhaled carbon dioxid and moisture that further breathing of the air would be harmful, and the submarine would in a short time be compelled to rise to the surface of the water to replenish its air supply. To allow a longer period of submergence, the air is purified and freed of its carbon dioxid usually by being forced through an absorbent for the carbon dioxid, such as soda lime. The absorbent is contained in large canisters which are connected to fans or blowers which systematically circulate the air through the absorbent, thus purifying it, and then throughout the different parts of the vessel.

A soda lime for this purpose should be very active, have high absorption efficiency, offer low resistance to the passage of air, and be hard and granular. A high activity is desirable in order that the carbon dioxid may be rapidly removed from the air and to insure a more or less complete purification of the air even when it is forced through the soda lime at a high rate. The material should be hard in order to withstand rough handling in transit and on board ship without crumbling or packing of the granules, as this would result in the canister offering great resistance to air blown through, thus decreasing the efficiency of the blower.

My improvements in the process for making absorbents, such as soda lime, result in making large scale manufacture possible, allow of accurate control of the process and give a uniform product of improved characteristics.

In one aspect my invention comprises proportioning the constituents, using substantially completely slaked lime, producing a product having a predetermined and uniform moisture content, avoiding the introduction of carbon dioxid into the product during the manufacture, and in the setting and drying of the finished product. My invention also contemplates a product having increased hardness, where the hardness of the finished product is a determining factor in the usefulness of my absorbent. It is to be understood that each of the above improvements constitutes an improvement over the existing processes and each may be considered a distinct advance in the method of manufacture of soda lime.

A process of manufacture of soda lime hitherto used, which is typical of prior processes consists in spreading granular unslaked lime on a cement floor, sprinkling the same with an equal weight of 5% solution of sodium hydroxid and continually shoveling the lime to obtain thorough mixing. A large amount of heat is developed by the slaking of the lime and much of the excess water is evaporated by reason of this fact. The soda lime thus formed breaks up into small lumps and finally into a mass of tiny particles of variable sizes. The larger lumps are broken up by shoveling and the material is screened. If the product is too dry it is sprinkled with a little water; ordinarily, however, it is shoveled directly into cans for use. This process has many objectionable features; first, being a hand process there is practically no possibility of accurate control. It is a batch process and therefore not adapted to large scale manufacture. The slaking of the lime by the use of the caustic soda solution is objectionable in that the heat developed varies and hence the amount of water evaporated is also variable and the moisture remaining in the soda lime is neither constant nor uniform. Some of the lime may not even become hydrated. Since relatively small variations in the water content have a marked influence on the properties of the finished product, accurate moisture control is necessary. The mixture being made in the open air, much opportunity is presented for the absorption of carbon dioxid into the soda lime, thus destroying part of its efficiency. The product formed has poor physical properties; it is extremely soft having practically no hardness, offers great resistance to the passage of air, packs easily, deliquesces on account of its high moisture content which is variable, and the particles are small, friable, irregular and of variable composition.

By my process I have been able to obviate all these disadvantages in the manufacture and characteristics of the finished product. The soda lime produced by my process is very active, dry, hard, granular, has a low alkali content, uniform moisture content, does not cake up and may be cheaply made.

A specific example of my process is as follows: An alkali such as caustic soda, is dissolved in water to form a 20% solution; 60 pounds of this solution are measured and run into a mixer, 120 pounds of water are added, and 300 pounds of a substantially completely hydrated alkaline earth metal oxid, such as slaked lime, is delivered from an over-head hopper in two or three separate portions into the mixer where the constituents are completely mixed for about ten or fifteen minutes. The material is dumped out onto a slabbing table and spread out by hand into smooth slabs in wire bottom trays which measure 18 by 36 inches and are 1½ inches deep and made of heavy iron wire. The trays are piled up in racks in a setting room and allowed to set for about three days, preferably at a slightly elevated temperature. The racks are taken into a vacuum dryer where the individual trays are removed and placed on the shelves of the drier.

The material is dried to a moisture content of about 14%. The trays are removed and allowed to stand in the drying room for several hours until they are entirely cool; this permits of a uniform distribution of the water remaining in the soda lime. It is very desirable to allow this cooling and adjustment and redistribution of the water content before grinding, after which the material is screened to 8–14 mesh and filled into drums for use.

By a series of tests I have found that the absorption efficiency of the soda lime rises rapidly up to about 4% caustic soda and begins to drop off very rapidly above 6 or 7% caustic alkali content. It has been found that the maximum absorption efficiency is obtained when the caustic alkali content is between 2 and 8%, soda lime containing 4% caustic alkali being considered the most efficient mixture. Caustic alkali contents above 8% can be used if the material be dried to about 8% or less water, but such over-dried material is a poor absorbent.

The water content of the wet mixture is an important factor in the hardness of the final product. If the amount of water used is either too small or too great a soft friable product will result. The exact amount of water necessary varies with the type of mixer used and the temperature, but the minimum amount of water should be used which will permit of thorough mixing and the formation of a uniform plastic mass of wet material. This minimum amount of water can be estimated under each set of circumstances by some suitable test, such as the resistance offered by the plastic mixture to the penetration of a needle or bar under predetermined conditions. The final moisture content is also an important variable. Up to a certain point, about 19%, the more water in the final product, the better is the absorption efficiency of the soda lime. This increased efficiency is largely due to the activating influence of water on the absorption of practically all acid gases. The effect of water content on hardness is just the reverse of its effect on absorption efficiency; materials containing over 15% of water cannot be efficiently ground or screened, especially in wet weather. A water content, therefore, of about 14% is preferable to give the maximum hardness and absorption efficiency. I have found that the optimum water content varies for different gases, for instance, a moisture content of 14–20% has been found most efficient for carbon dioxid.

It is also possible to dry to about 10% water, then grind and spray the granules up to 16–20% water. Material having a high moisture content ordinarily introduces difficulties in grinding and this can be avoided by producing a material having a comparatively low water content, then grinding and finally increasing the moisture content to the desired degree. The time of setting is less important than the other factors, and at present allowing the material to set three days is considered sufficient. The drying which preferably is in a vacuum, takes place at a temperature of 70°–100° C.

I have found that the greater the apparent density of the material the greater is its hardness. Hence, greater hardness can be obtained by pressing the wet material, as in a hydraulic press, to squeeze out excess water before allowing it to set. However, at present this step is considered unnecessary and is not being used, since the soda lime appears to have sufficient hardness under actual service conditions. I have also found that the use of a binding agent to produce hardness, results in a great loss of absorption efficiency. It is to be understood that I do not intend to limit myself to the specific proportions of the ingredients of my absorbent, nor to the exact method of producing the same as set forth above, nor are any improvements limited to the production of soda lime, but I claim the product and process broadly except as limited by the following claims:

1. A gas absorbing mixture containing from 2-8% caustic alkali calculated on a dry basis.

2. A mixture for the absorption of gases containing approximately 4% caustic alkali and approximately 96% alkaline earth metal hydroxid calculated on a dry basis.

3. A soda lime containing less than 8% caustic soda calculated on a dry basis and less than 20% moisture in the finished product.

4. A mixture of the soda-lime type for treating gases containing between 9 and 20% of water in the finished product and possessing the property of absorbing said gases.

5. A gas absorbent having lime as a major component and containing from 14-20% of water in the finished product.

6. The process of producing absorbents for gases which consists in mixing substantially completely hydrated oxid of alkaline earth metal with a small amount of caustic alkali.

7. The process of producing absorbents for gases which consists in mixing slaked lime with a small amount of caustic alkali in solution, and drying the same.

8. The process of producing absorbents for gases which consists in mixing slaked lime with a small amount of caustic alkali in solution, allowing the material to set, and drying the same.

9. The process of producing soda lime which consists in mixing five parts of slaked lime, one part by weight of 20% caustic soda solution and two parts of water, allowing the material to set and drying the same until the moisture content is approximately 14%.

10. In the process of producing gas absorbents containing lime as a major component, the step which consists in pressing the wet mixture before setting to remove water and increase the hardness of the finished product.

11. In a process of producing gas absorbents of the soda-lime type containing lime as a major component, the steps which consist in drying the material to a comparatively low water content, grinding and then adding water to raise the moisture content to the desired degree.

12. In the process of producing gas absorbents containing lime as a major component the steps which consist in drying the material to a water content of about 10%, grinding the same, and then adding water to raise the moisture content to 16-20%.

13. In a process of producing gas absorbents of the soda-lime type containing lime as a major component, the step which consists in adding the minimum amount of water necessary to form a wet, plastic mixture.

ROBERT E. WILSON.